United States Patent [19]
Errington

[11] Patent Number: 6,042,277
[45] Date of Patent: Mar. 28, 2000

[54] CAMERA FLASH BRACKET

[76] Inventor: Dale R. Errington, 3546 Mapleway Dr., Toledo, Ohio 43614

[21] Appl. No.: 09/392,174

[22] Filed: Sep. 9, 1999

Related U.S. Application Data

[63] Continuation-in-part of application No. 09/047,709, Mar. 25, 1998, abandoned
[60] Provisional application No. 60/041,649, Mar. 27, 1997.

[51] Int. Cl.[7] ..................................... G03B 17/00
[52] U.S. Cl. .......................... 396/419; 396/422; 396/420; 396/428; 248/187.1
[58] Field of Search ................................... 396/419, 420, 396/422, 428; 248/187.1

[56] References Cited

U.S. PATENT DOCUMENTS

| | | | |
|---|---|---|---|
| 3,575,098 | 4/1971 | Jones | 396/422 |
| 3,855,602 | 12/1974 | Hoos | 396/422 |
| 3,893,145 | 7/1975 | King | 396/422 |
| 4,104,623 | 8/1978 | Sloop | 396/422 |
| 4,187,021 | 2/1980 | Balser | 396/422 |
| 4,198,150 | 4/1980 | Sloop | 396/422 |
| 4,255,036 | 3/1981 | Pincetich | 396/422 |
| 4,291,967 | 9/1981 | Jackson, Jr. | 396/422 |

*Primary Examiner*—Eddie C. Lee
*Attorney, Agent, or Firm*—Marshall & Melhorn

[57] ABSTRACT

A camera flash bracket comprising a rotary bracket on which the camera may be mounted, an "L" arm rotatably connected to the rotary bracket, a flash arm fixedly connected to the "L" arm for supporting a flash, means, with at least a portion of said means connected between said "L" arm and said rotary bracket for rotating the flash arm relative to the camera and means, with at least a portion of said means interposed between said rotary bracket and said "L" arm, for fixedly securing the flash in one of two predetermined positions with respect to a camera.

26 Claims, 7 Drawing Sheets

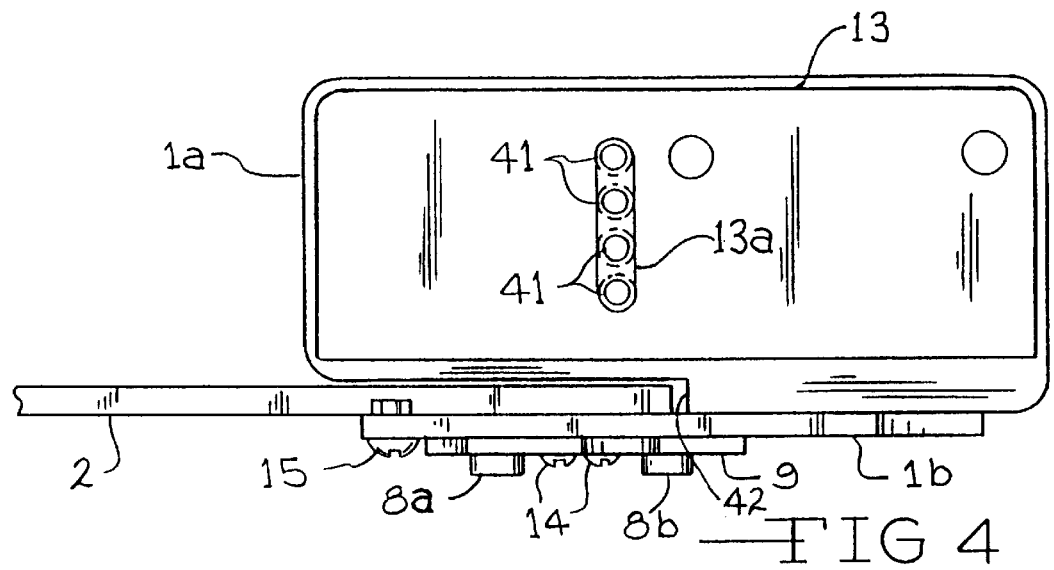
FIG 4
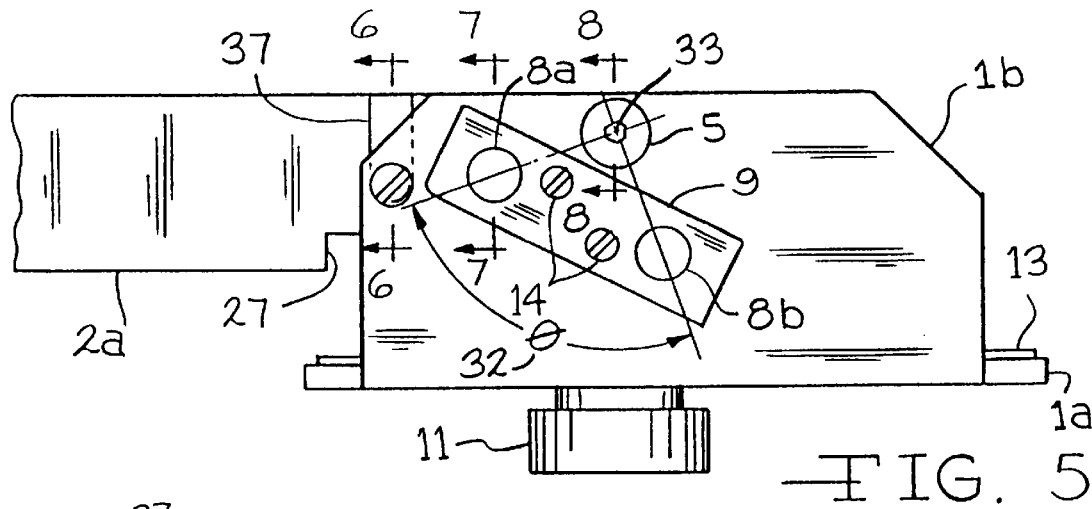
FIG. 5
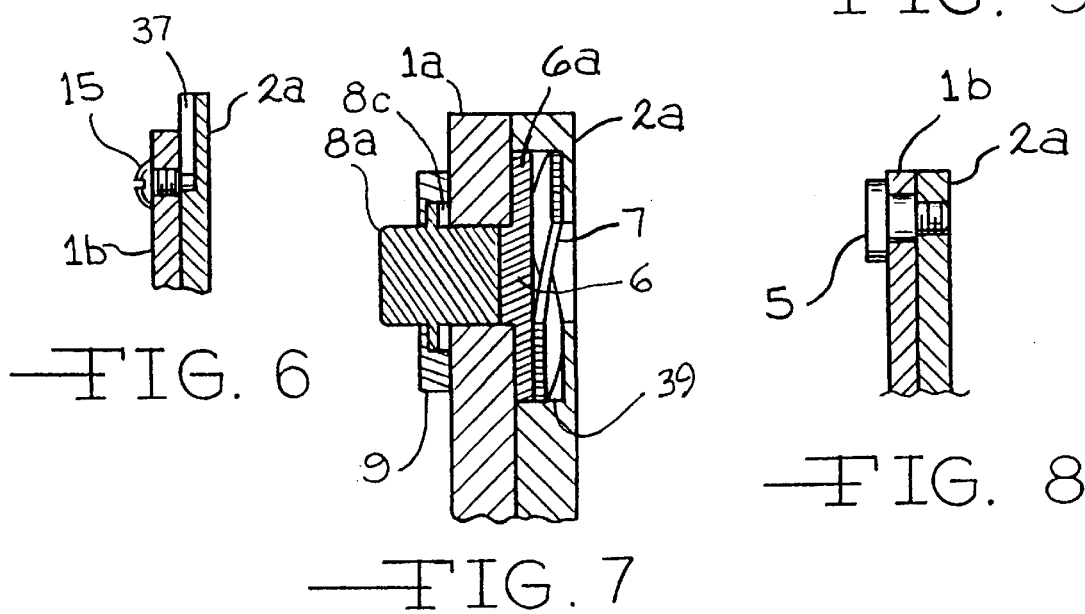
FIG. 6
FIG. 7
FIG. 8

CAMERA FLASH BRACKET

CROSS REFERENCES TO RELATED APPLICATIONS

This application is a continuation-in-part of Ser. No. 09/047,709, filed Mar. 25, 1998 in the name of Dale R. Errington, now abandoned, which is a conversion of provisional patent application Ser. No. 60/041,649, filed Mar. 27, 1997. The priority of Ser. Nos. 09/047,709 and 60/041,649 is specifically claimed.

BACKGROUND OF THE INVENTION

1. Field of the Invention

The present invention relates to a method and apparatus for use in photography for taking shadowless pictures. More particularly, the present invention relates to a method and apparatus for use in photography whereby the camera is always maintained below the flash. Most particularly, the present invention relates to a method and apparatus for use in photography whereby the camera flash attachment is mounted on a bracket which may rotate substantially around the center line of the camera lens mounted to the apparatus of the present invention.

2. Description of Related Art

Photographers continually strive to take shadowless pictures, and photography stores and suppliers sell many flash devices that portend to provide lighting to take shadowless pictures.

U.S. Pat. No. 3,575,098 shows a flat, normally horizontal, rectangular mounting base supported manually by a single handle connected at its lower end to the outer end of a leftward extension of the base near the front end of the left edge of said base, said handle normally extending upright, but being pivotably adjustable forwardly relatively to said extension about a transverse horizontal axis. A flash unit supporting arm extends upwardly from the upper end of the handle at a slight inclination relative thereto to within a short distance of a vertical plane containing the optical axis of a camera mounted on said base.

U.S. Pat. No. 3,855,602 shows a camera bracket having a member with a base portion on which a camera can be detachably secured, and a second portion supporting a pivoting arm which, in turn, rotatably supports a member on which a flash attachment may be detachably connected.

U.S. Pat. No. 3,893,145 shows an adjustable portable hand-held strobe extender and camera support unit made of detachable and extensible sections in combination with the camera support platform and handle grip means with the top, land, or plane surface connected at the lower end of the extender in one socket of a two-way pan connector.

U.S. Pat. No. 4,104,623 shows an apparatus for holding a camera and flash unit so they are separated from one another, including a frame having an upper portion for holding the flash unit and a lower portion for holding the camera, and having a pair of laterally spaced handles near the lower portion. The handles are oriented so they can be held comfortably at slightly below eye-level with the upper arms extending down and braced against the body and the forearms extending upwardly.

U.S. Pat. No. 4,187,021 shows a camera attachment having an elongated base frame with vertical handles at each end and a camera attachment plate centrally located between the handles. A double parallelogram linkage consisting of a pair of inter-parallel links with the links connected to the upper end of one of the handles, a floating swing link, and an outer pair of pivotable links connected to a clamp ring provides support for a flash unit positioned in the clamp ring.

U.S. Pat. No. 4,255,036 shows a support for a camera and a photographic lamp which includes a vertical center section, a horizontal arm extending from the top of the center section to support the lamp, and a pivotal base that supports the camera beneath the lamp.

U.S. Pat. No. 4,291,967 shows an anatomically-shaped hand-grip assembly having a positive locking adjustment capability relative to a base plate to which a camera may be secured, and a positive locking adjustable flashshoe mounted on the top surface of the grip.

None of the devices shown in the related art provide a camera flash bracket whereby the camera is rotatable between its horizontal and vertical positions about or around the center line of the camera lens, and is lockable in two fixed positions. Thus, those skilled in the art continued to look for a satisfactory solution for taking shadowless pictures.

The present invention overcomes the deficiencies of the aforementioned devices and offers the high degree of positioning flexibility that is needed to satisfactorily accomplish the task of taking shadowless pictures.

SUMMARY OF THE INVENTION

The problems present in the art are solved by the present invention by utilizing a camera flash bracket for attaching a flash to a camera which comprises a rotary bracket on which the camera may be mounted, an "L" arm rotatably connected to the rotary bracket, and a flash arm fixedly connected to the "L" arm for supporting a flash. Included are means, with a least a portion of said means, connected between said "L" arm and said rotary bracket, for rotating the flash arm relative to the camera, so that the flash may be positioned directly above said camera, substantially coaxial with said camera lens with only the thumb and fingers of one hand, and means, with at least a portion of said means interposed between said rotary bracket and said "L" arm, for fixedly securing the flash in one of two predetermined positions.

In one embodiment of the present invention, a camera flash bracket is provided having a rotary bracket, an "L" arm rotatedly mounted to the rotary bracket, and a flash arm fixedly connected to said "L" arm for supporting the flash. Means for rotating the flash arm are provided with at least a portion connected between the "L" arm and the rotary bracket so that the flash may be positioned directly above said camera, coaxial with said camera lens, by rotating the flash arm relative to said camera, or vice versa. In addition, means for rigidly securing the flash in one of two predetermined positions with respect to the camera are provided wherein at least a portion of said means for rigidly securing are interposed between said rotary bracket and said "L" arm.

In another embodiment of the present invention, in addition to the above elements of the invention, a quick-release adaptor is mounted to the camera flash bracket so different cameras are easily interchangeable, and the same flash bracket can be used with multiple cameras.

Thus, it is an object of the present invention to provide a camera flash bracket that is ergonomic and easy to use.

It is a further object of the p resent invention to provide a camera flash bracket that is compact and user friendly.

It is a still further object of the present invention to provide a camera flash bracket of the foregoing nature which may be easily assembled and disassembled.

A still further object of the present invention is to provide photographers with a tripod socket in the bottom of a hand grip forming a portion of the camera flash bracket which will provide for quick horizontal or vertical orientation of the camera without requiring a change in the camera tripod setup.

Further objects and advantages of the present invention will be apparent from the following description and appended claims, reference being made to the accompanying drawings forming a part of the specification, wherein like references characters designate corresponding parts in the several views.

BRIEF DESCRIPTION OF THE DRAWINGS

FIG. 4 is a top plan view (partially cut away) of the construction illustrated in FIGS. 1–3;

FIG. 5 is a rear elevational view of the construction shown in FIGS. 1–4;

FIG. 6 is a sectional view, taken in the direction of the arrows, along the section line 6—6 of FIG. 5;

FIG. 7 is a sectional view, taken in the direction of the arrows, along the section line 7—7 of FIG. 5;

FIG. 8 is a sectional view, taken in the direction of the arrows, along the section line 8—8 of FIG. 5;

DESCRIPTION OF THE PREFERRED EMBODIMENT

Figure 1:
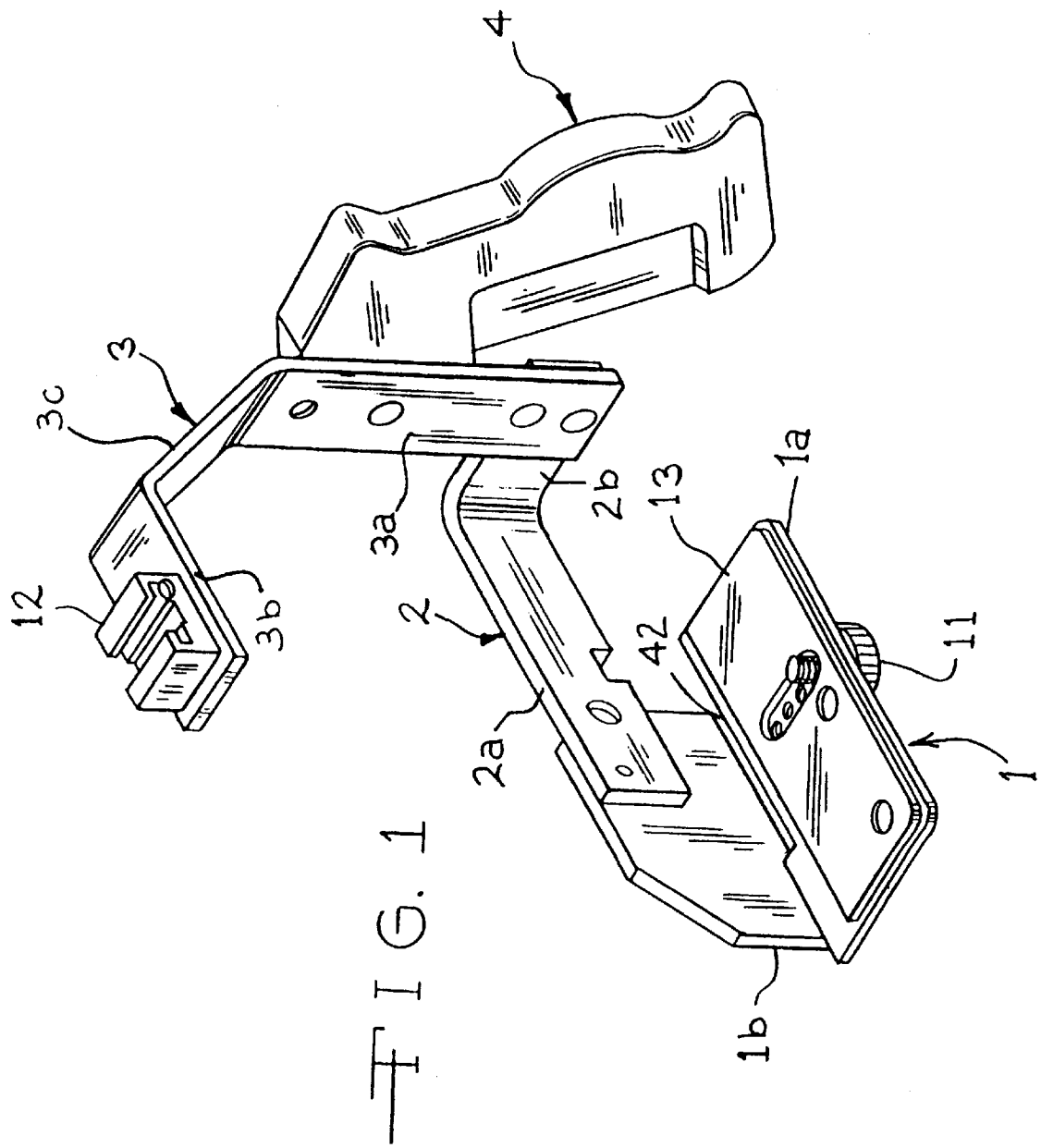
FIG. 1 shows a perspective view of a construction embodying the present invention.
Figure 2:
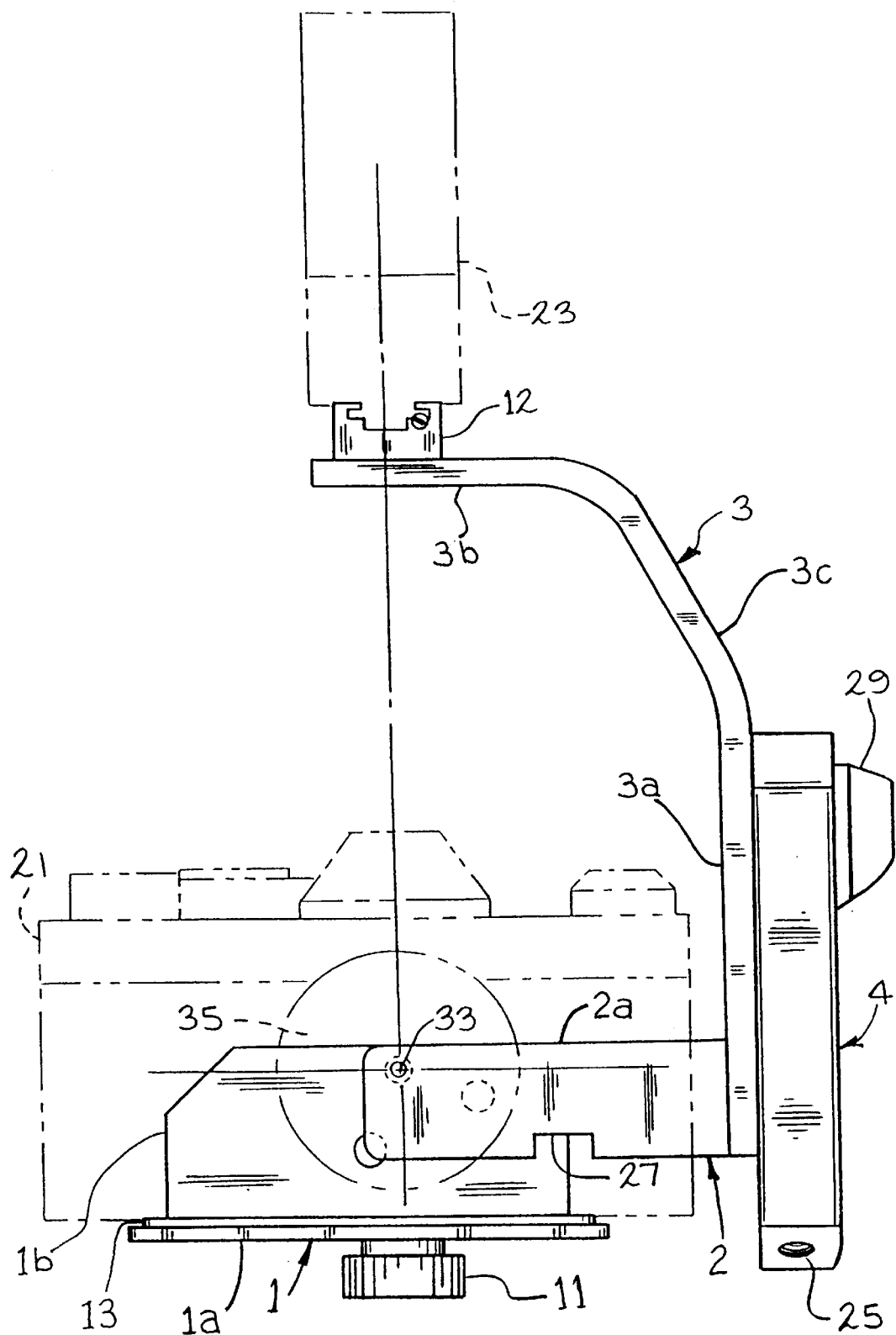
FIG. 2 is a front elevational view of the construction shown in FIG. 1, and illustrating a camera in its horizontal position.
Figure 3:
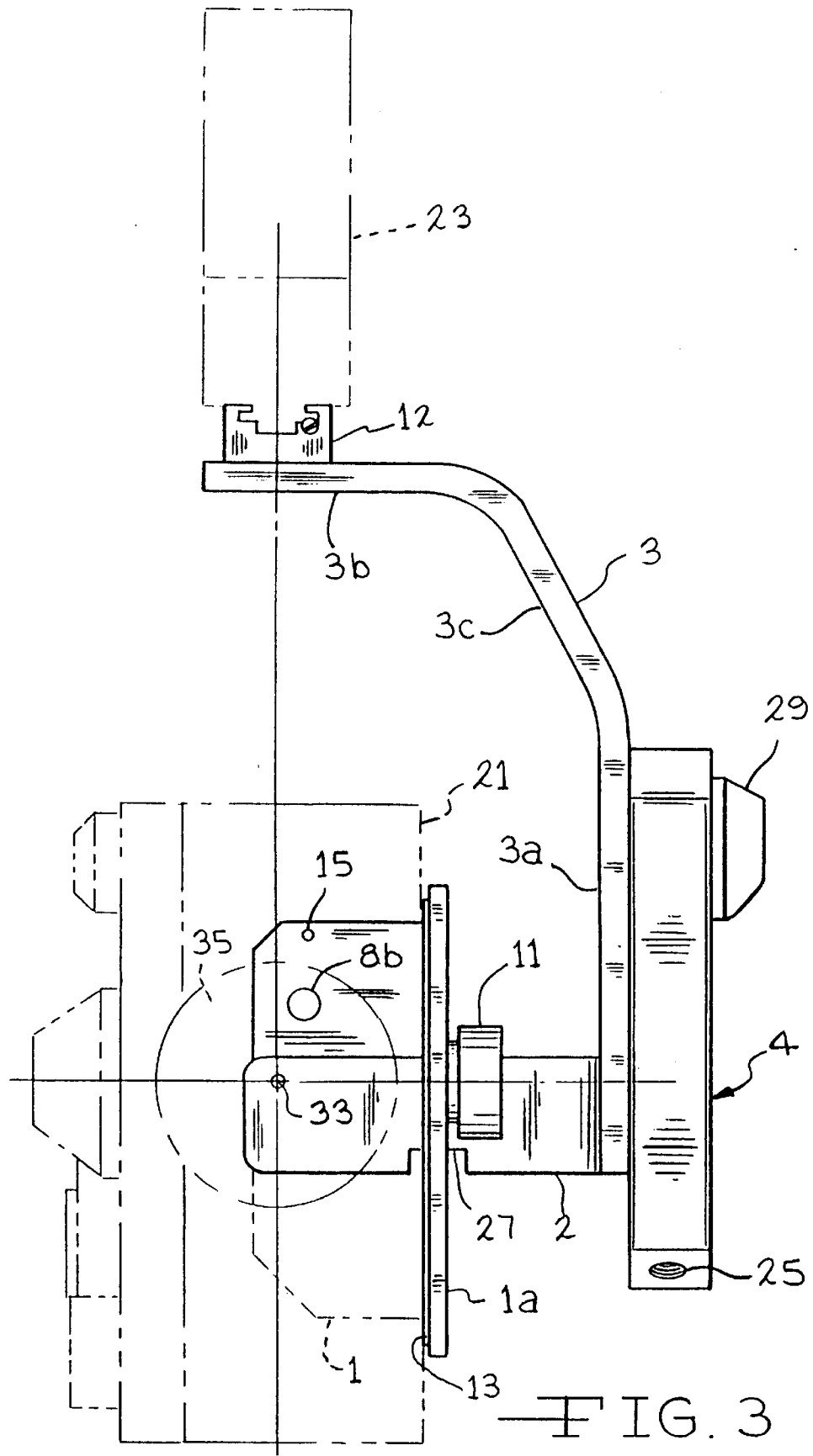
FIG. 3 is a view similar in part to FIG. 2, but showing the camera rotated ninety (90) degrees, to its vertical position or orientation.

Referring now to FIGS. 1–3, there is shown a perspective view of a construction embodying the present invention. Regardless of how a camera 21 is oriented, vertically or horizontally, the camera 21 may be rotated with respect to the flash arm 3, locating a flash 23 in a precise predetermined position, substantially above the camera 21, and substantially coaxial with the camera lens. This allows a photographer to maintain a high quality of the taken pictures. Absent the ability to relocate the flash 23 with respect to the camera 21, the pictures will have a distinct shadow of the pictured objects relative to the position of the flash 23.

As shown in FIG. 1, rotary bracket 1 consists of a base 1a, and a flange 1b extending 90 degrees to the base 1a. The camera 21 may be attached to the base 1a with a lock screw 11. A rubber pad 13, placed between the camera 21 and the base 1a, provides a firm support for the camera 21. The rubber pad 13 also prevents the crashing of the camera bottom as the lock screw 11 is tightened and the camera 21 is pressed against the base 1a.

A first portion 2a of "L" arm 2 is rotatably mounted to the flange 1b of rotary bracket 1 with rotary plate lock bolt 5 (FIG. 5). The manner of mounting (FIG. 8) allows a photographer to rotate the "L" arm 2 (or the rotary plate 1) with the rotary plate lock bolt 5 as a pivotal point without major effort when a camera needs to be reoriented from horizontal to vertical position, and vice versa. A slot 42 between the base 1a and the flange 1b of the rotary base 1 extends proximately three-quarters of the way through "L" arm 2, and accommodates the "L" arm 2 as it revolves around the rotary bracket. A second portion 2b of the "L" arm 2 is fixedly connected to a vertical portion 3a of the flash bracket 3 with screws 18 (FIG. 9).

The flash 23 may be attached to the camera flash bracket 3 with an accessory shoe 12. The accessory shoe 12 is mounted on a horizontal portion 3b of the flash arm 3 with a screw 20 (FIG. 9). An angled portion 3c may be provided on the flash arm 3, if desired.

Figure 9:
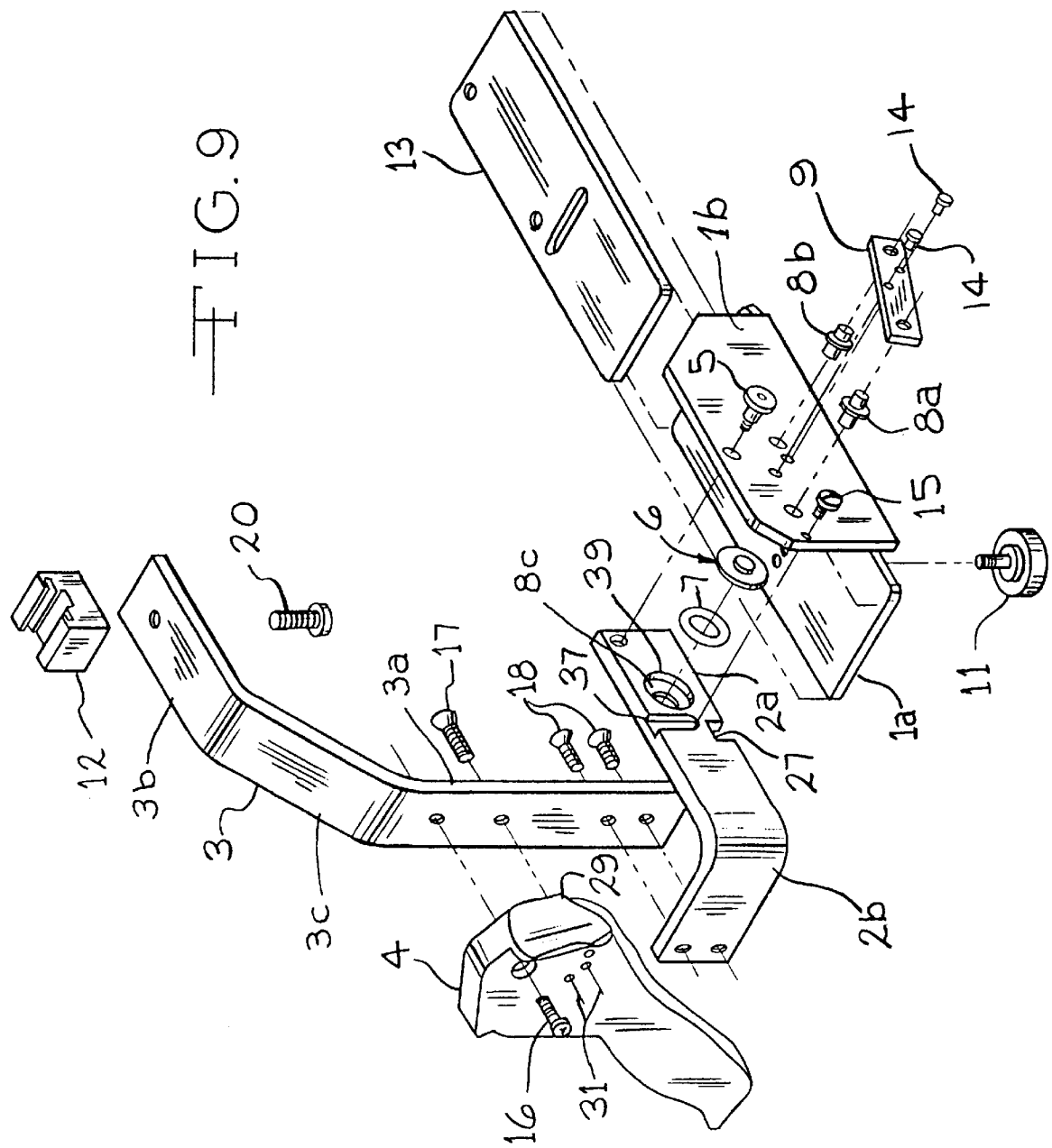
FIG. 9 is an exploded perspective view of the construction shown in FIG. 1, rotated one-hundred-eighty degrees (180°)

As illustrated in FIG. 1, a hand grip 4 is fixedly attached to the vertical portion 3a of the flash arm 3 with screws 16 and 17 (FIG. 9). For the photographer's convenience, and to improve the balance and control of the camera flash bracket, the hand grip 4 includes a thumb rest 29 (FIG. 9). Also, the hand grip 4 includes two spaced-apart holes 31. Depending on the size of the photographer's hand, the hand grip 4 may be coupled with the flash arm 3 employing one of the holes 31 and the screw 17. To provide a greater flexibility in using the invention, the hand grip 4 also includes an internally threaded tripod socket 25 (FIG. 2) for releasably connecting the camera flash bracket with a tripod.

In FIG. 4, a series of tapped holes 41, extending laterally in the center of the base 1a, allow the use of the invention with different cameras. Depending on the size of a camera, the appropriate hole may be employed for attaching a camera securely to the camera flash bracket. The rubber pad 13 also has a hole extending laterally in the center to accommodate different size cameras. Once a camera is attached to the camera flash bracket and adjusted, it is not necessary to readjust a camera further until the camera flash bracket needs to be used with another camera.

One of the unique features of the invention entails an enormous convenience for a photographer. That is, an ability to rotate the camera 21 with only a thumb and fingers of one hand. This is not possible with the prior art devices. Two push buttons, 8a and 8b (FIG. 5), provide means for achieving such result.

As illustrated on FIG. 4, a rectangular retainer 9 keeps both push buttons 8a and 8b releasably attached to the flange 1b with holding screws 14. Locator 6 includes a protruding flange 6a (FIG. 7) which locks the "L" arm 2 in one of the two predetermined positions until one of the two push buttons 8a or 8b is pressed. By pressing push button (8a, 8b), a photographer pushes the protruding flange 6a of the locator 6 into a round spring pocket 39 (FIG. 9) located within the first portion 2a of the "L" arm 2. Once a push button (8a, 8b) is pressed, and the locator 6 is fully inside the spring pocket 39, the protruding flange of the locator 6 will permit the "L" arm 2 to revolve in an arc from one predetermined position to another. When the "L" arm 2 reaches one of the predetermined positions, the push button (8a, 8b) may be released. The releasing of push button (8a, 8b) returns the protruding flange 6a of the locator 6 to a position at the top of the spring pocket 39 against the force of washer 7 and locks the "L" arm 2 in one of the two predetermined positions so that the flash 23 is substantially above the camera 21 coaxial with camera lens. Annular recesses 8c in the retainer 9 limit the travel of pushbuttons 8a, 8b.

Referring to FIG. 9, a clearance slot 27 extending laterally upward on the first portion 2a of the "L" arm 2 mates with the slot between the base 1a and the flange 1b of rotary base 1 when the "L" arm 2 and the base 1a are positioned perpendicularly to each other.

A stop screw 15 cooperating with slot 37 insures that the "L" arm 2 is locked securely in one of the predetermined locations until one of the push buttons 8a or 8b is pressed. When the "L" arm 2 is rotated, the stop screw 15 travels up or down inside slot 37, which is proximately located above the slot 27 on the first portion 2a of the "L" arm 2, and extends laterally downward. Once the stop screw 15 reaches the bottom of the slot 37, further swinging movement of the "L" arm 2 in the same direction is impossible. Thus, the invention warrants that a flash, once it reaches a certain precisely predetermined position above a camera, substantially coaxial with a camera lens, remains there without any manual effort by a photographer.

Figure 10:
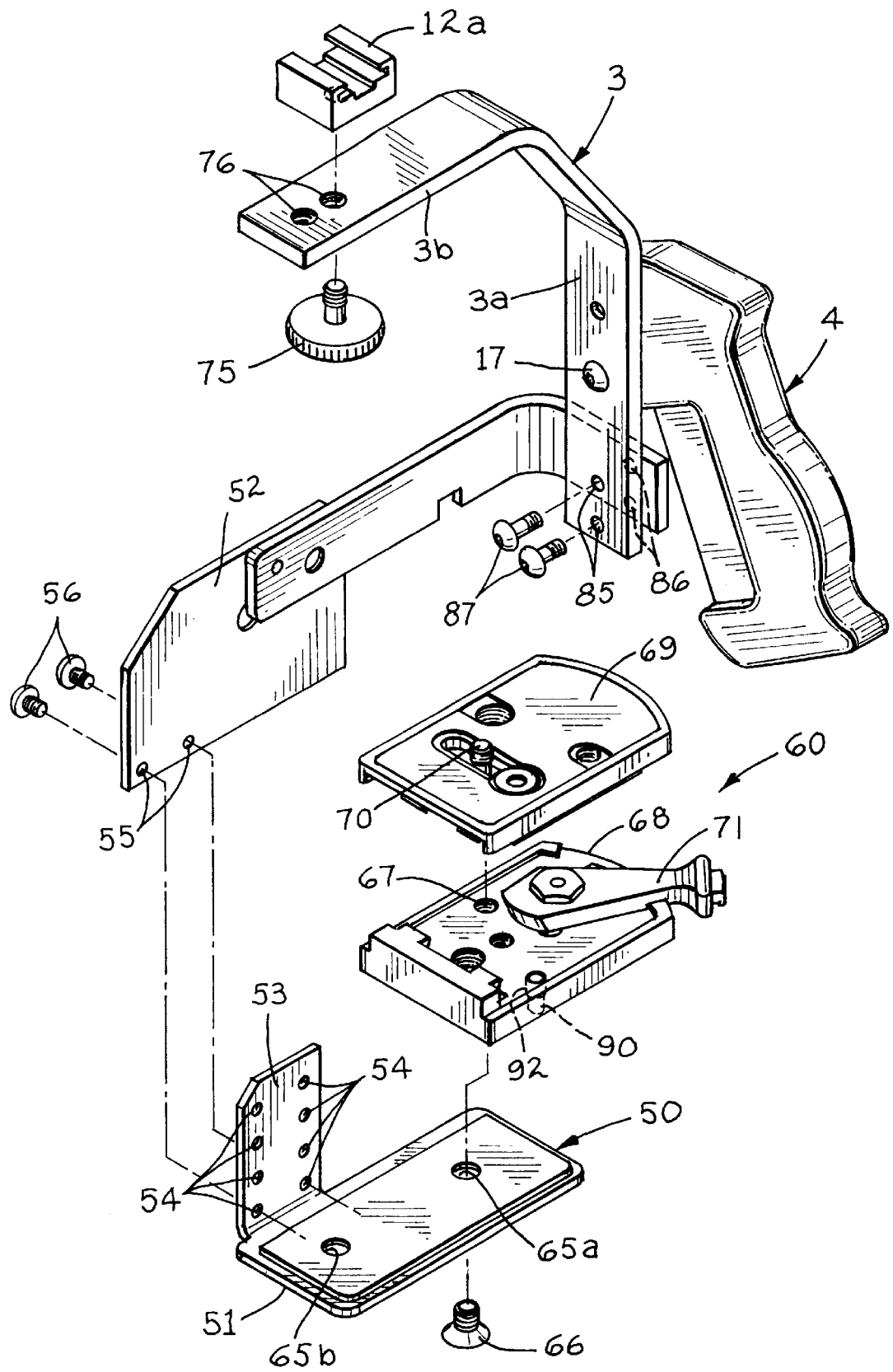
FIG. 10 is an exploded perspective view of a modification of the present invention.
Figure 11:
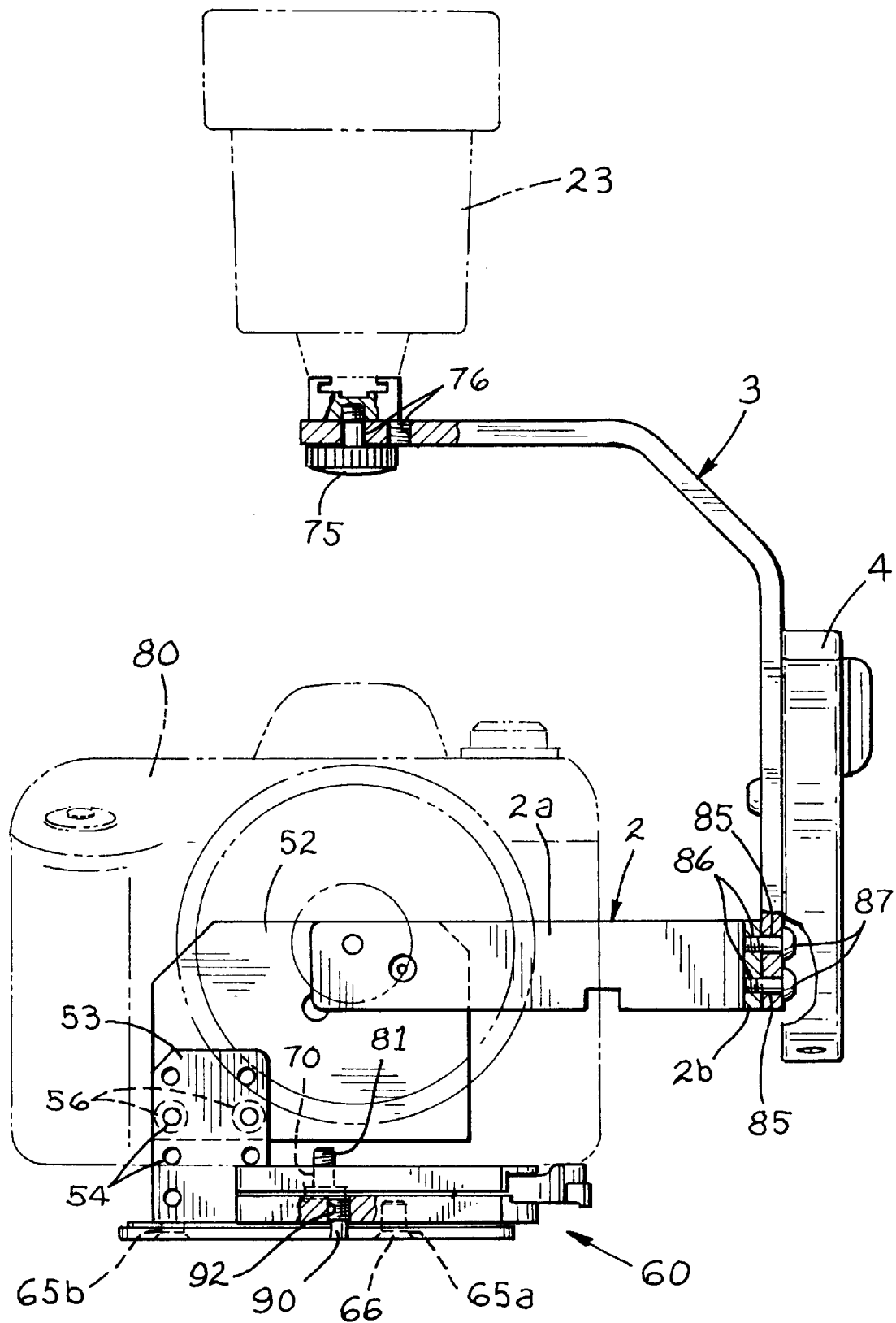
FIG. 11 is a front plan view of the construction shown in FIG. 10, but showing a further modification of the present invention.

Referring now to FIGS. 10 and 11, there are shown modifications of the present invention which provide additional convenience for the photographer and permit a wider variety of cameras to be mounted thereon.

Referring specifically to FIG. 10, the rotary bracket, which for clarity will now be referred to by the numeral 50, has a base 51 and a separate and distinct flange 52. Base 51 has a vertically oriented extension 53, having a plurality of pairs of laterally-spaced threaded apertures 54. Flange 52 has a single pair of mating holes 55 of slightly larger diameter than the apertures 54. It can be seen when one of the pair of apertures 54 is placed in a mating position with the spaced-apart holes 55, the attachment screws 56 can be inserted therein and tightened. Thus, in addition to the commonly available 35 mm format cameras, most taller cameras, such as 35 mm cameras with motor drive, and 120 roll cameras (known as medium format cameras) can also be used with ease simply by moving the rotary bracket 50 up and down with respect to the flange 52.

The modification shown in FIG. 10, in addition to accommodating a wider range of cameras, also provides for the addition of a quick-release 60. The quick-release 60 is intended to be a commercially available unit. The quick-release 60 illustrated is the Manfrotto Model 3270 Low Profile Quick-Release Adaptor. Other commercially available units may be used in connection with the present invention. The rotary bracket 50 has at least one and preferably 2 and possibly more mounting holes (65a, 65b) through which mounting screw 66 may be passed to engage the mounting hole 67 placed in the base 68 of the quick-release 60. Attachment plate 69 snaps into base 68 of the quick-release 60 in a manner well-known in the art. Camera 80 has been previously mounted to the attachment plate 69 by way of the camera mounting screw 70 engaging tripod socket 81 of the camera 80. Movement of lever 71 between a first and second position releases attachment plate 69 and allows another camera, which would already have another attachment plate 69 attached, to be quickly snapped in to the camera bracket of the present invention. Thus the modification shown in FIG. 10 not only allows for variety of cameras to be used with my invention but also provides for quick attachment and release of those cameras.

In some medium format cameras, the center line of the lens will not be lined up with the flash. To have shadowless pictures it will be necessary to move the flash 23 to a position substantially coaxial with the axis of the camera lens. This is provided for by having a removable accessory shoe 12a mounted to the horizontal portion 3b of flash bracket 3 by an accessory shoe mounting screw 75 which may be passed through one of the shoe mounting holes 76. The accessory shoe 12a may be moved from one location to another, as needed. The remainder of the construction of the modification shown in FIG. 10 remains essentially the same as that previously described and like numerals are used to indicate like items in FIG. 10.

Referring now to FIG. 11, a further modification of the present invention is shown in FIG. 11 which may be especially useful for medium format cameras. To accommodate the bulkier shape of the medium format camera 80, the flash bracket 3 is mounted on the outside or other side of second portion 2b of the "L" arm 2, instead of on the inside of "L" arm 2 as illustrated in FIG. 1.

To maintain the flash 23, substantially coaxial with the center line of the camera lens, a pair of holes 85 and mating apertures 86 have been provided in the first or vertical portion 3a of the flash arm 3. When the flash arm 3 is mounted on the other side of the second portion 2b of the "L" arm 2, the mounting screws 87 are simply inserted from the other side. This allows medium-format cameras to be easily accommodated in the camera flash bracket of the present invention.

In those cases where the camera tripod socket 81 of the camera 80 is substantially offset from the center line of the camera, such as in the Nikkon FA and MD11 and MD12 cameras, the quick-release 60 may be mounted using the hole 65b instead of the hole 65a, and the center line of the camera lens is then maintained substantially coaxial with the flash 23. To provide for leveling of the rotary bracket 1 when a camera is attached, a leveling screw 90 may be provided in a threaded aperture 92 placed in base 68 of quick-release 60.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A flash bracket for attaching a flash to a camera, which comprises:

a rotary bracket upon which said camera may be mounted;

an "L" arm rotatably connected to said rotary bracket;

a flash arm, fixedly connected to said "L" arm, for supporting said flash; and a rotary plate lock bolt connected between said "L" arm and said rotary bracket to permit rotation of said flash arm relative to said camera with said rotary plate lock bolt as the pivotal point so that said flash may be positioned directly above said camera, coaxial with said camera lens; and a locator interposed between said rotary bracket and said "L" arm for rigidly securing said flash in one of two predetermined positions.

2. The flash bracket defined in claim 1, wherein said flash arm includes a hand grip releasably connected to said flash arm for increased convenience, which comprises a thumb rest for improved balance and control of said flash bracket; and an internally threaded tripod socket located proximately in the bottom of said hand grip for coupling with a camera tripod; and two holes situated on the side of said hand grip for adjusting the positioning of said hand grip relative to said flash bracket.

3. The flash bracket defined in claim 1, wherein said "L" arm includes a first portion rotatably mounted to said rotary bracket, and a second portion.

4. The flash bracket defined in claim 3, wherein said flash arm includes a vertical portion extending upwardly from and connected to said second portion of said "L" arm and a horizontal portion.

5. The flash bracket defined in claim 4, wherein said flash arm further includes an angled portion connecting said horizontal portion of said flash arm and said vertical portion of said flash arm.

6. The flash arm defined in claim 4, wherein said horizontal portion of said flash arm includes an accessory shoe for attaching said flash, said accessory shoe being mounted on said horizontal portion of said flash arm.

7. The flash bracket defined in claim 3, wherein said rotary bracket includes a base with series of tapped holes laterally extending approximately in the center of said base.

8. The rotary bracket defined in claim 7, wherein said base includes a lock screw for rigidly securing said flash bracket to said camera.

9. The rotary bracket defined in claim 7, wherein said base includes a rectangular rubber pad, rigidly attached to the top of said base of said rotary bracket, for support and cushioning of said camera.

10. The flash bracket defined in claim 7, wherein said rotary bracket includes a flange extending 90 degrees to said base for pivotally attaching said "L" arm.

11. The flash bracket defined in claim 10, wherein said "L" arm includes a slot extending laterally downward on said first portion of said "L" arm and facing said flange of said rotary bracket.

12. The said flash bracket defined in claim 11, wherein said "L" arm further includes a clearance slot located on said first portion of said "L" arm and facing said flange of said rotary bracket, approximately under said slot, and extending laterally upward.

13. The rotary bracket defined in claim 10, wherein said flange includes a stop screw located in an upper left corner of said flange of said rotary bracket.

14. The rotary bracket defined in claim 13, wherein said stop screw further includes a protruding portion situated in the back of said flange of said rotary bracket and above said base of said rotary bracket so that said protruding portion of said stop screw may travel up or down inside said slot.

15. The flash bracket defined in claim 10, wherein said rotary bracket further includes a bracket slot located between said base of said rotary bracket and said flange of said rotary bracket extending about ¾ way through for accommodating said "L" arm when said rotary bracket is rotated.

16. The flash bracket defined in claim 10, and further including two push buttons having parallel axes, releasably attached to said flange of said rotary bracket.

17. The flash bracket defined in claim 16, wherein said flash bracket further includes;

a rectangular retainer to releasably secure said two push buttons to said flange of said rotary bracket; and a pair of holding screws for rigidly securing said rectangular bracket to said flange of said rotary bracket.

18. The flash bracket defined in claim 16, wherein said locator, when aligned with one of said push buttons, releases said rotary bracket allowing it to rotate freely up to predetermined vertical or horizontal position.

19. The "L" arm defined in claim 16, wherein said first portion of said "L" arm includes a spring pocket located within said first portion of said "L" arm facing said flange of said rotary bracket so that when one of said push buttons is pressed, said locator mates with said spring pocket releasing said rotary bracket, and allowing said rotary bracket to swing an arc of up to 90 degrees from horizontal to vertical positions, and vice versa.

20. The flash bracket defined in claim 1, wherein said locator is a male receptacle.

21. The flash bracket defined in claim 1, wherein a quick-release is mounted to said rotary bracket.

22. The flash bracket defined in claim 21, wherein said quick-release includes:

a) a base, and b) an attachment plate.

23. The flash bracket defined in claim 22, wherein said quick-release base includes a leveling screw threadably mounted thereto.

24. The flash bracket defined in claim 1, and further including:

a) a plurality of quick-release mounting holes provided in said rotary bracket, and b) a quick-release mounted to said rotary bracket utilizing at least one of said mounting holes.

25. The flash bracket defined in claim 1, wherein said rotary bracket includes a) a flange portion, said flange portion including at least one pair of spaced-apart mounting holes, and b) a base portion, said base portion including:
  i) an extension portion having a plurality of spaced apart threaded apertures, said base portion mounted to said flange portion by passing a pair of attachment screws through said pair of spaced-apart mounting holes in said flange portion, and engaging one of said pairs of said plurality of pairs of spaced-apart threaded apertures.

26. The flash bracket defined in claim 1, wherein said flash arm includes a plurality of accessory shoe mounting holes and an accessory shoe mounted to said flash arm through one of said accessory shoe mounting holes using an accessory shoe mounting screw.

* * * * *